(12) United States Patent
Kanno et al.

(10) Patent No.: US 9,568,751 B2
(45) Date of Patent: Feb. 14, 2017

(54) OPTICAL CONTROL DEVICE

(75) Inventors: Shinsuke Kanno, Tokyo (JP); Ryo Shimizu, Tokyo (JP)

(73) Assignee: SUMITOMO OSAKA CEMENT CO., LTD., Chiyoda-Ku, Tokyo (JP)

(*) Notice: Subject to any disclaimer, the term of this patent is extended or adjusted under 35 U.S.C. 154(b) by 157 days.

(21) Appl. No.: 13/876,811

(22) PCT Filed: Sep. 29, 2011

(86) PCT No.: PCT/JP2011/072387
§ 371 (c)(1),
(2), (4) Date: May 28, 2013

(87) PCT Pub. No.: WO2012/043724
PCT Pub. Date: Apr. 5, 2012

(65) Prior Publication Data
US 2013/0243364 A1    Sep. 19, 2013

(30) Foreign Application Priority Data
Sep. 30, 2010    (JP) .................. 2010-222572

(51) Int. Cl.
*G02F 1/035*    (2006.01)

(52) U.S. Cl.
CPC ............. *G02F 1/035* (2013.01); *G02F 1/0356* (2013.01); *G02F 2201/121* (2013.01)

(58) Field of Classification Search
CPC ...... G02F 1/0018; G02F 1/011; G02F 1/0113; G02F 1/0121; G02F 1/0123; G02F 1/0154; G02F 1/025; G02F 1/0316; G02F 1/0327; G02F 1/035; G02F 1/065; G02F 1/0356; G02F 1/2255
See application file for complete search history.

(56) References Cited

U.S. PATENT DOCUMENTS

| 5,161,206 A * | 11/1992 | Djupsjobacka ....... G02F 1/0327 385/2 |
| 5,252,180 A | 10/1993 | Sang, Jr. et al. |
| 5,388,170 A | 2/1995 | Heismann et al. |
| 6,192,167 B1 | 2/2001 | Kissa et al. |

(Continued)

FOREIGN PATENT DOCUMENTS

| JP | 7-199134 A | 8/1995 |
| JP | H7-325276 | 12/1995 |

(Continued)

*Primary Examiner* — John M Bedtelyon
(74) *Attorney, Agent, or Firm* — Taft Stettinius & Hollister LLP

(57) ABSTRACT

An optical control device is provided which can suppress crosstalk between electrodes without increasing the entire size of the device itself. The optical control device includes a substrate having an electro-optical effect, an optical waveguide formed in the substrate, and a modulation electrode modulating optical waves propagating in the optical waveguide. The modulation electrode includes at least two signal electrodes and ground electrodes arranged to interpose the signal electrodes therebetween. The optical control device further includes an electrical connection member that electrically connects the ground electrode disposed between the two signal electrodes to other ground electrodes and that is disposed to cross over part of the signal electrode.

1 Claim, 3 Drawing Sheets

(56) References Cited

U.S. PATENT DOCUMENTS

| | | | | |
|---|---|---|---|---|
| 7,689,067 B2* | 3/2010 | Ichikawa | ............... | G02F 1/035 385/2 |
| 8,849,071 B2* | 9/2014 | Kissa | ...................... | G02F 1/225 385/3 |
| 2003/0228081 A1 | 12/2003 | Tavlykaev et al. | | |
| 2004/0001242 A1 | 1/2004 | Shigeta et al. | | |
| 2009/0290206 A1 | 11/2009 | Sugiyama | | |
| 2010/0067840 A1 | 3/2010 | Sugiyama | | |

FOREIGN PATENT DOCUMENTS

| | | |
|---|---|---|
| JP | 2005-274889 A | 10/2005 |
| JP | 2007-264063 A | 10/2007 |
| JP | 2009-53444 A | 3/2009 |
| JP | 2009-181108 A | 8/2009 |
| JP | 2010-72129 A | 4/2010 |

\* cited by examiner

BEFORE IMPROVEMENT

AFTER IMPROVEMENT

OPTICAL CONTROL DEVICE

BACKGROUND OF THE INVENTION

Field of the Invention

The present invention relates to an optical control device, and more particularly, to an optical control device having two or more signal electrodes as a modulation electrode.

Description of Related Art

Optical control devices have been used in which optical waveguides and modulation electrodes are formed in a substrate such as lithium niobate or the like having an electro-optical effect and optical waves propagating in the optical waveguides are modulated by the modulation electrodes. Recently, in order to meet requirements such as an increase in communication speed or an increase in communication data rate in the fields of optical communications or the like, plural Mach-Zehnder type optical waveguides (MZ-type optical waveguides) are driven using plural modulation signals in a differential quadrature phase shift keying (DQPSK) format.

In an optical control device having plural optical waveguides and plural signal electrodes, different modulation signals are often input to the signal electrodes and the different modulation signals are applied to the optical waveguides. Accordingly, when an electric field other than from a predetermined modulation signal acts on a specific optical waveguide, optical characteristics of the optical control device such as an extinction ratio of signal light degrade. This phenomenon is referred to as crosstalk.

In order to suppress the crosstalk between electrodes, it is effective to increase the gap between the optical waveguides or the gap between the electrodes, but this method causes an increase in device size, which is not desirable. As described in Japanese Laid-open Patent Publication No. 2009-53444, a method of forming a groove between optical waveguides or between signal electrodes has been proposed. However, since a process of forming the groove is particularly added to the optical control device manufacturing process, the manufacturing time and cost increase. In optical control devices using a substrate with a thickness of 30 µm or less, there is a problem in that a groove cannot be formed or that the substrate is easily destroyed even when the groove can be formed.

With an increase in frequency bandwidth of a modulation signal, a local potential difference corresponding to an operating state is generated between ground electrodes interposing a signal electrode therebetween. Accordingly, a phenomenon occurs in which a variation in electric field generated between a signal electrode and ground electrodes interposing the signal electrode therebetween differs on both sides of the signal electrode. When such electric fields are applied to the optical waveguides, an intended operation of modulation cannot be expected and modulation characteristics of the optical control device degrade considerably.

CITATION LIST

Patent Literature

[PTL 1] Japanese Laid-open Patent Publication No. 2009-53444

SUMMARY OF THE INVENTION

Technical Problem

The present invention is made to solve the above-mentioned problems and an object thereof is to provide an optical control device which can suppress crosstalk between electrodes without increasing the device size. Another object of the present invention is to provide an optical control device which can perform a stable modulating operation even at wide-band frequencies.

Solution to Problem

According to a first aspect of the present invention, there is provided an optical control device including: a substrate having an electro-optical effect; an optical waveguide formed in the substrate; and a modulation electrode modulating optical waves propagating in the optical waveguide, wherein the modulation electrode includes at least two signal electrodes and ground electrodes arranged to interpose the signal electrodes therebetween, and wherein the optical control device further includes an electrical connection member that electrically connects the ground electrode disposed between the two signal electrodes to other ground electrodes and that is disposed to cross over part of the signal electrode.

A second aspect of the present invention provides the optical control device according to the first aspect, wherein the electrical connection member is disposed in interaction portions in which the modulation electrode modulates the optical waves.

According to a third aspect of the present invention, there is provided an optical control device including: a substrate having an electro-optical effect; an optical waveguide formed in the substrate; and a modulation electrode applying a high-frequency signal for modulating optical waves propagating in the optical waveguide, wherein the modulation electrode includes ground electrodes disposed to interpose a signal electrode therebetween in an interaction portion in which the modulation electrode modulates the optical waves, and wherein the ground electrodes interposing the signal electrode therebetween are electrically connected to each other through the use of an electrical connection member so as to suppress occurrence of a local potential difference corresponding to an operating state. The term "operating state" means a state where a high-frequency signal is applied to the modulation electrode, and the term "corresponding" means corresponding to a state varying from time to time.

A fourth aspect of the present invention provides the optical control device according to any one of the first to third aspects, wherein the electrical connection member is formed by arranging a plurality of conductive members formed of a conductive wires or a conductive ribbon, and wherein the gap between the conductive members is set to a half wavelength or less of an electrical signal propagating in the signal electrode.

According to the first aspect of the present invention, since the modulation electrode includes at least two signal electrodes and ground electrodes disposed to interpose the signal electrodes therebetween and the electrical connection member disposed to cross over part of the signal electrode is used to electrically connect the ground electrode disposed between the two signal electrodes to other ground electrodes, it is possible to reinforce and stabilize the ground state of the ground electrodes and to prevent an electric field formed by the signal electrodes from going over the ground electrodes and affecting the neighboring signal electrodes or optical waveguides. Since the ground state of the ground electrodes is reinforced and stabilized by the electrical connection member, it is not necessary to increase the gap between the optical waveguides or the gap between the signal electrodes, unlike the related art, and it is thus possible to suppress an increase in size of the optical control device.

According to the second aspect of the present invention, since the electrical connection member is disposed in the interaction portion in which the modulation electrode modulates the optical waves, it is possible to suppress degradation of signal light in the interaction portion which is most important in forming signal light and it is thus possible to provide an optical control device with excellent optical characteristics such as an extinction ratio of signal light.

According to the third aspect of the present invention, since the modulation electrode applying a high-frequency signal includes the ground electrodes disposed to interpose the signal electrode therebetween in the interaction portion in which the modulation electrode modulates the optical waves and the ground electrodes interposing the signal electrode therebetween are electrically connected to each other through the use of the electrical connection member so as to suppress occurrence of a local potential difference corresponding to an operating state, the potential generated between the ground electrodes is stabilized. Accordingly, the variation in electric field generated between the signal electrodes and the ground electrodes can be maintained in the same phase on both sides of the signal electrodes and it is thus possible to suppress degradation in modulation characteristics at wide band frequencies.

According to the fourth aspect of the present invention, since the electrical connection member is formed by arranging plural conductive members formed of a conductive wire or a conductive ribbon and the gap between the conductive members is set to a half wavelength or less of an electrical signal propagating in the signal electrodes, it is possible to effectively suppress leakage of an electric field formed by the signal electrode through the gap between the conductive members and to prevent occurrence of crosstalk. It is also possible to efficiently apply an electric field formed by the signal electrode to the optical waveguides and to suppress degradation in modulation characteristics at wide band frequencies.

DETAILED DESCRIPTION OF THE INVENTION

Description of Embodiments

Figure 1:
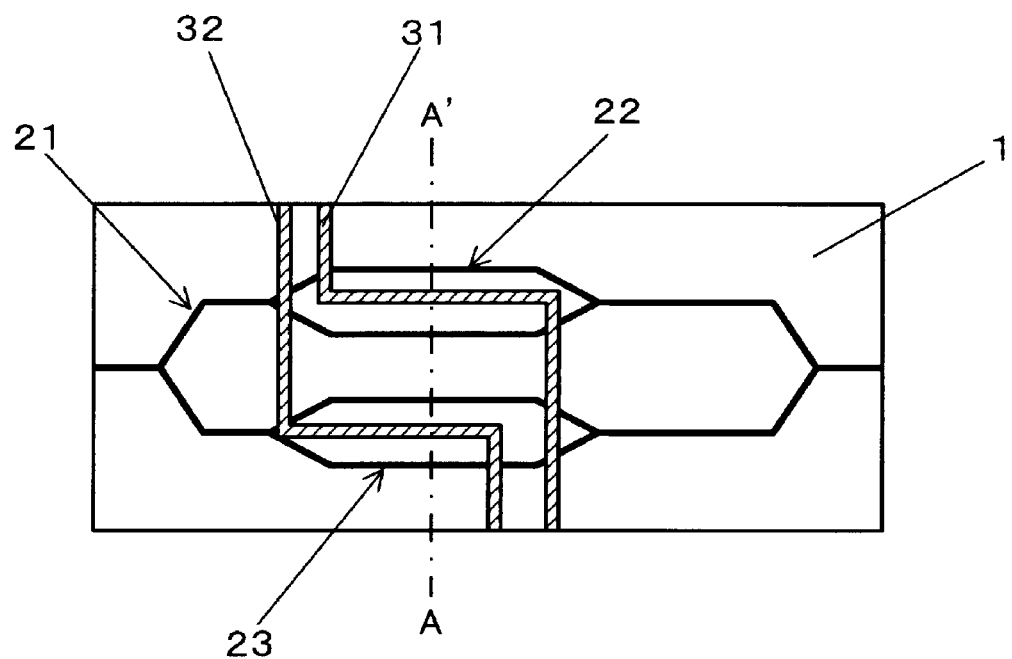
FIG. 1 is a diagram schematically illustrating the configuration of an optical control device having a nested type optical waveguide.
Figure 2:
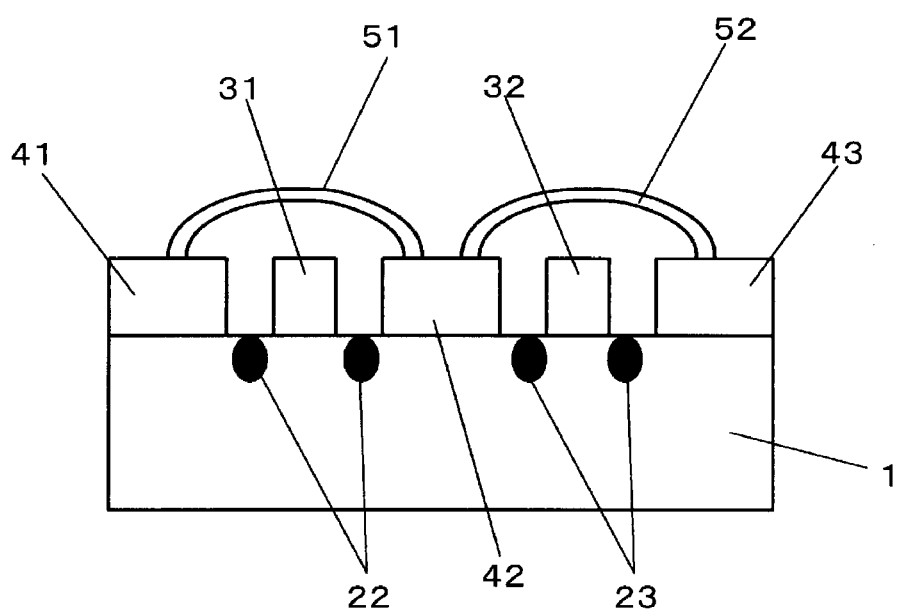
FIG. 2 is a cross-sectional view taken along one-dotted chain line A-A' of FIG. 1.

Hereinafter, an optical control device according to the present invention will be described in detail with reference to a suitable example. FIG. 1 is a diagram schematically illustrating the configuration of an optical control device according to the present invention and FIG. 2 is a cross-sectional view taken along one-dotted chain line A-A' of FIG. 1. As shown in FIGS. 1 and 2, the optical control device according to the present invention includes a substrate 1 having an electro-optical effect, optical waveguides 21 to 23 formed in the substrate, and a modulation electrode modulating optical waves propagating in the optical waveguides, the modulation electrode includes at least two signal electrodes 31 and 32 and ground electrodes 41 to 43 arranged to interpose the signal electrodes therebetween, and the optical control device further includes electrical connection members 51 and 52 that electrically connects the ground electrode disposed between the two signal electrodes to other ground electrodes and that is disposed to cross over part of the signal electrode.

Any monocrystalline material of $LiNbO_3$, $LiTaO_5$, and PLZT (Lead Lanthanum Zirconate Titanate) can be suitably used for the substrate 1 having an electro-optical effect. Particularly, $LiNbO_3$ and $LiTaO_5$ widely used for optical control devices such as optical modulators can be preferably used. The optical waveguides are formed in the substrate, for example, by thermally diffusing a material such as titanium (Ti) having a high refractive index on an $LiNbO_3$ substrate (LN substrate). Ridge type optical waveguides in which unevenness is formed along the optical waveguides in the substrate can be also used. In FIG. 2, the optical control device employs an X-cut substrate, but the present invention is not limited to the X-cut substrate and may employ a Z-cut substrate.

The optical waveguide shown in FIG. 1 is a so-called nested type optical waveguide in which two sub MZ-type optical waveguides 22 and 23 are inserted into a main MZ-type optical waveguide 21 in an embedded form. The optical control device according to the present invention is not limited to this optical waveguide, but the configuration of the present invention can be applied with technical superiority to an optical control device having plural optical modulation sections like the nested optical waveguide, because a crosstalk phenomenon can easily occur therein.

The modulation electrode includes signal electrodes 31 and 32 and ground electrodes 41 to 43, and Ti or Au electrode patterns can be formed on the surface of the substrate by a gold plating method or the like. If necessary, a buffer layer of a dielectric $SiO_2$ or the like may be formed on the surface of the substrate on which an optical waveguide is formed and the modulation electrode may be formed on the buffer layer. It is preferable that the optical control device according to the present invention have a configuration in which ground electrodes are disposed between plural signal electrodes.

Figure 3:
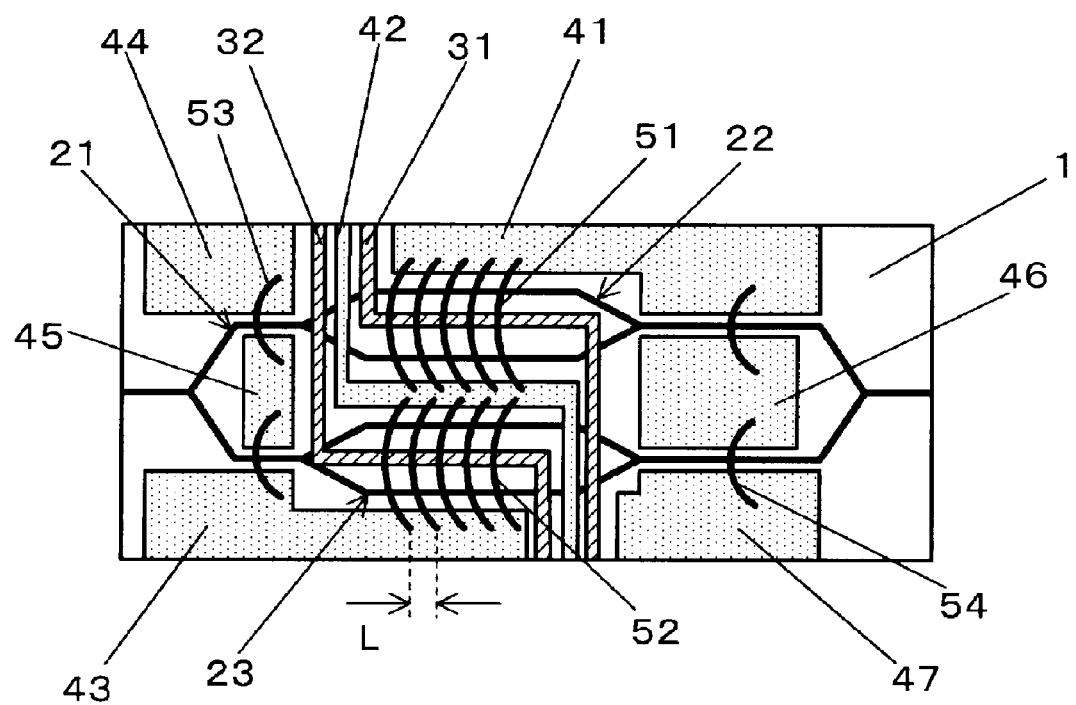
FIG. 3 is a plan view illustrating an optical control device according to the present invention.

Conductive wires or conductive ribbons such as gold wires or gold ribbons having high conductivity can be used as the electrical connection member used in the optical control device according to the present invention. An electrical connection member in which through-holes are formed in the substrate so as to electrically connect the surface of the substrate to the surface again through the rear surface thereof may be used. When plural conductive members 51 and 52 formed of a conductive wire or a conductive ribbon are used, the conductive members are arranged, as shown in FIG. 3. By arranging the conductive members in this way, the grounding state between the ground electrodes can be reinforced and stabilized. As the electrical connection member, bridge-like structures formed of a conductive material may be attached to each other with a conductive adhesive.

The optical control device is often placed in a metal case to form a module. In this case, the ground electrode in the vicinity of the side surface of the optical control device is connected to the metal case or a ground-side terminal of a signal line introduced from the outside.

As shown in FIG. 2, in the state where the ground electrodes 41 and 42 (or 42 and 43) are arranged with the signal electrode 31 (or 32) interposed therebetween, when a high-frequency modulation signal is applied to the signal electrode, a phenomenon occurs in which a local potential difference corresponding to the operating state is generated between the ground electrodes interposing the signal electrode therebetween and the variation in electric field differs on both sides of the signal electrode. This problem can also be solved by the use of the electrical connection member 51 (or 52) and it is thus possible to stabilize the modulation characteristics of the optical control device.

By setting the gap L between the conductive members to be equal to or less than half a wavelength of an electrical signal propagating in the signal electrode, it is possible to suppress leakage of the electric field from the signal electrode over the ground electrodes. More preferably, by setting the gap L to be equal to or less than 1/10 of the wavelength of the electrical signal, it is possible to satisfactorily suppress crosstalk. Since an electric field formed by the signal electrode is efficiently applied to the optical waveguide, it is also possible to suppress a decrease in modulation efficiency at wide band frequencies.

Figure 4A:
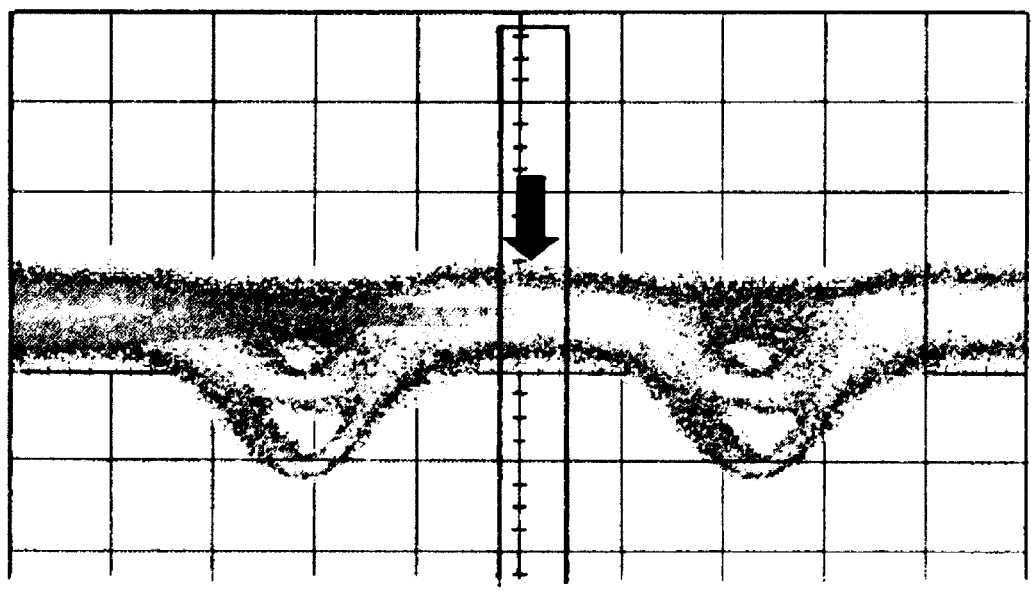
FIG. 4 is a diagram illustrating a difference in waveform of an optical signal depending on whether an electrical connection member is provided.
Figure 4B:
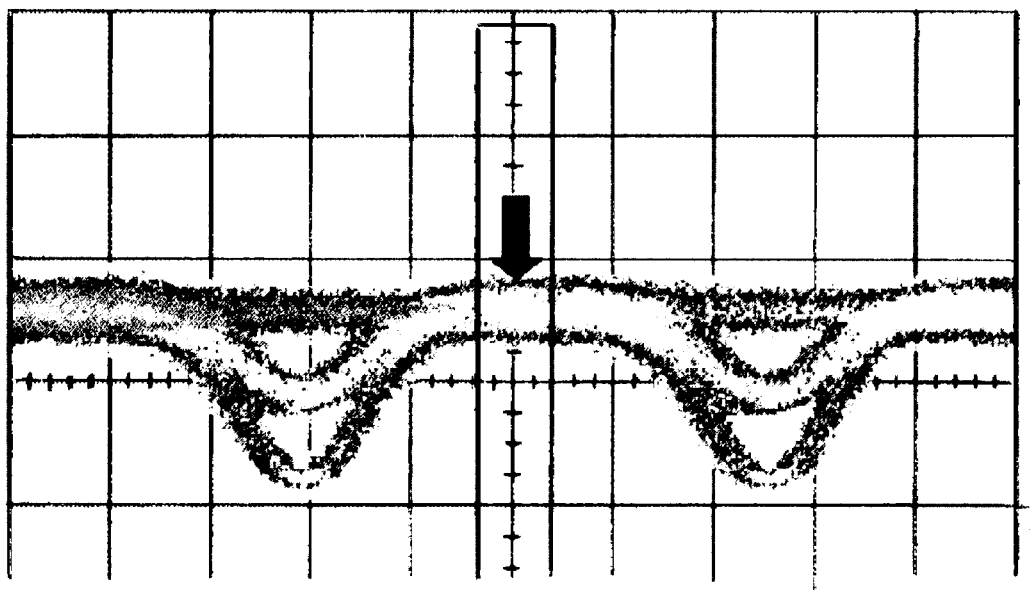

FIGS. 4A and 4B are diagrams illustrating signal waveforms when a conductive material is arranged with a gap L of 1/10 of the wavelength of an electrical signal as shown in FIG. 3 using gold wires as the conductive material. FIG. 4A shows a state where the electrical connection member is not provided (before improvement) and FIG. 4B shows a state where the electrical connection member is provided (after improvement).

By paying attention to the places indicated by arrows in FIGS. 4A and 4B, it can be easily understood that an extinction ratio is improved by improving a signal waveform in the optical control device according to the present invention.

As indicated by the arrangement position of the conductive member 51 or 52 in FIG. 3, it is preferable that the electrical connection member is disposed in an interaction portion in which the modulation electrode modulates the optical waves. This is because it is most necessary to suppress the crosstalk phenomenon in the interaction portion. This interaction portion is located at a position, which is farthest from the place (in the vicinity of the top and bottom side surfaces of the optical control device shown in FIG. 3) where the ground electrodes are connected to the metal case of the module, around the center of the substrate of the optical control device. Accordingly, since it is difficult to guarantee a satisfactory grounding state, it is necessary to reinforce and stabilize the grounding state using the electrical connection member of the present invention.

Regarding the relationship between the signal electrodes or the optical waveguides, when isolated ground electrodes 45 and 46 are formed as shown in FIG. 3, it is more preferable that the ground electrodes be electrically connected to each other using conductive materials 53 and 54 to further stabilize the grounding state.

INDUSTRIAL APPLICABILITY

As described above, according to the present invention, it is possible to provide an optical control device which can suppress crosstalk between electrodes without increasing the size of the device itself. It is also possible to provide an optical control device which can perform a stable modulating operation at wide band frequencies.

REFERENCE SIGNS LIST 1 substrate
21-23 optical waveguide
31,32 signal electrode
41-47 ground electrode
51-54 conductive material

What is claimed is:
1. An optical control device comprising:
a substrate having an electro-optical effect;
an optical waveguide formed in the substrate; and
a modulation electrode modulating optical waves propagating in the optical waveguide, wherein
the optical waveguide is a nested type optical waveguide in which a first sub Mach-Zehnder type optical waveguide and a second sub Mach-Zehnder type optical waveguide are inserted into a main Mach-Zehnder type optical waveguide in an embedded form,
the modulation electrode comprises ground electrodes and at least two separate signal electrodes,
at least a first one of the separate signal electrodes is arranged to modulate optical waves propagating in the first sub Mach-Zehnder type optical waveguide,
the ground electrodes include a first ground electrode and a second ground electrode with the first sub Mach-Zehnder type optical waveguide interposed therebetween,
the second ground electrode is arranged to be interposed between the first sub Mach-Zehnder type optical waveguide and the second sub Mach-Zehnder type optical waveguide,
a first electrical connection member electrically connects the first ground electrode to the second ground electrode, and
the first electrical connection member is disposed to cross over the first sub Mach-Zehnder type optical waveguide and said first separate signal electrode that modulates optical waves propagating in the first sub Mach-Zehnder type optical waveguide,
at least a second one of the separate signal electrodes is arranged to modulate optical waves propagating in the second sub Mach-Zehnder type optical waveguide,
the ground electrodes further comprise a third ground electrode, and the second sub Mach-Zehnder type optical waveguide is interposed between the second ground electrode and the third ground electrode,
a second electrical connection member electrically connects the second ground electrode to the third ground electrode, and the second electrical connection member is disposed to cross over the second sub Mach-Zehnder type optical waveguide and said second separate signal electrode that modulates optical waves propagating in the second sub Mach-Zehnder type optical waveguide,
at least one of the first electrical connection member and the second electrical connection member is comprised of a plurality of conductive members formed of conductive wire or conductive ribbon, and
a gap between the conductive members is set to a half wavelength or less of a modulating electrical signal propagating in the signal electrode over which the conductive members cross.

* * * * *